3,597,323
METHOD OF PURIFYING L-ASPARAGINASE
Joseph Roberts, Dallas, Tex., assignor to J. K. and Susie L. Wadley Research Institute and Blood Bank, Dallas, Tex.
No Drawing. Filed June 7, 1968, Ser. No. 735,195
Int. Cl. C07g 7/02
U.S. Cl. 195—66                                      17 Claims

ABSTRACT OF THE DISCLOSURE

A method of purifying L-Asparaginase from a mixture containing a ruptured microbial organism which yields L-Asparaginase by adding to the mixture a sufficient quantity of a water-miscible organic solvent, such as ethanol, to precipitate the cell walls of the organism and other undesirable constituents present in the mixture without precipitating the L-Asparaginase. The supernatant is then separated from the precipitated residue and the L-Asparaginase precipitated from the supernatant by adding more of the water-miscible organic solvent. The precipitate containing the L-Asparaginase is then separated from the supernatant, suspended in a suitable buffer, such as a potassium phosphate solution and chromatographically separated from the other constituents which precipitate with the L-Asparaginase. The chromatographic separation is preferably effected by sequentially eluting the L-Asparaginase from two columns, one of which contains an anion exchange resin and the other of which contains a cation exchange resin. The L-Asparaginase solution eluted from the first column is preferably collected, concentrated by the addition of the solution of a sufficient quantity of a water-miscible organic solvent, such as ethanol, and re-suspended in a suitable buffer before admission to the second column.

Any residual endotoxin and pyrogen contained in the eluted L-Asparaginase containing solution from the second column are removed by admixture of a buffered solution (pH 6.8–6.9) containing re-concentrated L-Asparaginase with activated charcoal. The activated charcoal is then removed by filtration.

FIELD OF THE INVENTION

This invention relates to chemistry, and more particularly to a method of purifying L-Asparaginase produced from microbial organisms.

PRIOR ART

In 1953 it was observed that guinea pig serum caused regression of some types of tumors in mice and rats. Eight years later the antitumor agent in the guinea pig serum was identified as L-Asparaginase. L-Asparaginase as used herein is intended to identify the enzyme L-Asparagine amidohydrolase having the Enzyme Commission Number 3.5.1.1.

Analysis revealed that the normal guinea pig yielded only about 30 International Units of L-Asparaginase which rendered the cost of the drug prohibitive for administration to humans. One International Unit (I.U.) of L-Asparaginase is that amount which will liberate one micromole of $NH_3$ from L-Asparagine per minute at 37° C. and pH 8. Specifically, human dosage may require 1,000,000 I.U. or more per day per person. Production of such dosages would necessitate that serum be extracted from 30,000 guinea pigs per day per person being treated with the serum. With the cost of guinea pigs being about $2 per guinea pig, the cost of one days dosage for one individual would amount to about $60,000 for the guinea pigs in addition to which must be added the cost of processing the large quantity of serum.

In 1964, it was learned that L-Asparaginase isolated from *Escherichia coli* (*E. coli*) also exhibited antitumor properties. Several methods were suggested for producing L-Asparaginase from *E. coli*. The *E. coli* was normally cultivated in a nutrient medium such as trypticase soy agar, peptone or Kornberg solutions. The *E. coli* after being cultivated for a period of 15 to 20 hours was harvested and the enzymes contained within the bacterial cells following rupture of the cells by sonication were purified by various procedures such as those suggested by Mashburn and Wriston (1966) Nature 211, 1403 and Mashburn and Wriston (1964) Arch. Biochem. Biophys. 105, 451.

More particularly, a typical purification procedure involved the treatment of the ruptured cell suspension with 0.05 volume of 1 M $MnCl_2$ to precipitate the ruptured cell walls and nucleic acids. The precipitant is then separated from the supernatant by centrifugation. L-Asparaginase in the supernatant is then precipitated by bringing the solution to 2 M by addition of $(NH_4)_2SO_4$ and adjusting the pH of the solution to 8.0 with $NH_4OH$. The precipitant is removed by centrifugation and the supernatant is brought to 4 M by the addition of $(NH_4)_2SO_4$ and the pH adjusted to 8.0 by addition of $NH_4OH$ resulting in a precipitant containing L-Asparaginase which is removed by centrifugation and redissolved by dialysis against 0.05 M sodium phosphate buffer having a pH of 8.6. The dialyzed enzyme solution is purified further by column chromatography. More particularly, the L-Asparaginase is eluted from a hydroxylapatite column which has been equilibrated with 0.05 M tris-HCl having a pH of 8.6. The elution may be effected with 0.10 M sodium phosphate or 0.10 M potassium phosphate. The effluent containing the L-Asparaginase can be further purified by elution from a diethylaminoethyl cellulose column (DEAE-cellulose) with sodium chloride solution, the concentration of which is varied over a range between 0.06 M and 0.2 M.

In short, the microbial organism is, after growth in a nutrient medium, treated to rupture the bacterial cell walls releasing the enzymes contained within the bacterial cells. The solution containing the L-Asparaginase is then treated with ammonium sulfate to precipitate L-Asparaginase and other proteins which are subsequently redissolved by a dialysis against a buffer solution. The dialyzed enzyme solution is then chromatographically purified to separate the L-Asparaginase from other proteins.

The techniques heretofore employed to produce L-Asparaginase from microbial organisms yielded only, after purification of the L-Asparaginase, about 10–15% of the L-Asparaginase in the original bacterial cells. Further, the specific activity (purity) of the L-Asparaginase is less than 200 International Units (I.U.) per milligram protein. This is a purity of less than 50%. L-Asparaginase produced commercially from nutrient media now in use and purified by current methods costs on the order of $40,000 per million I.U. which renders the drug too expensive for all but use in small experimental animals.

A portion of the great expense can be attributed to the tedious and time consuming step of redissolving the L-Asparaginase by dialysis after precipitation from a salt solution and chromatographically separating large quantities of solution.

Further, while the low purity L-Asparaginase eluted from the chromatographic column or columns may be used for treatment of animals, it contains excess impurities including endotoxin and pyrogen to be safely administered to humans in large enough dosages without adverse side effects from the treatment.

SUMMARY

The invention may be generally described as a method of purifying L-Asparaginase from a mixture containing a ruptured microbial organism which yields L-Asparaginase, including the steps of adding to the mixture containing the ruptured microbial organism a sufficient quantity of a water-miscible organic solvent to precipitate the cell walls and other undesirable constituents of the organism present in the mixture without precipitating the L-Asparaginase in the solution. The precipitated cell walls and other undesirable constituents are separated from the supernatant and a sufficient quantity of a water-miscible organic solvent added to the supernatant to precipitate the L-Asparaginase. The precipitate and supernatant are then separated and the precipitate is suspended in a buffer solution. L-Asparaginase in the buffer solution is then chromatographically separated from other constituents precipitated with the L-Asparaginase.

In a further aspect, the invention also contemplates the chromatographic separation being effected by sequential separation through two columns, one of which has an anion exchange resin and the other a cation exchange resin.

The invention is also directed to steps for removal of any residual endotoxin and pyrogen from an L-Asparaginase solution by adjusting of pH, heating, chilling, contacting with activated charcoal and filtration.

THE PREFERRED EMBODIMENTS

The present invention provides a method by which L-Asparaginase may be produced in 90 percent purity or greater (determined by ultracentrifugal, electrophoretic and chromatographic behavior). The L-Asparaginase will have a specific activity (which is a measure of purity) of greater than 420 I.U. per milligram protein and be substantially free of endotoxin and pyrogen, thus rendering it safe for human administration. Further, the time consuming steps of dialyzing L-Asparaginase containing solutions and chromatographically treating large quantities of liquid are eliminated. For a more complete understanding of certain aspects of the present invention and advantages inherent therein, reference is made to the following example:

EXAMPLE I

A nutrient medium for growth of a microbial organism was prepared by diluting 20 liters of a corn steep liquor, specifically Corn Steepwater (Corn Products Co., New York, N.Y.), to 60 liters with deionized water which was adjusted to pH 7.0–7.5 with potassium hydroxide. A heavy precipitate which formed during the adjustment of the pH of the Corn Steepwater solution was removed by filtration and the filtrate after being heated to the boiling point was again filtered. The resulting filtrate was then diluted to 400 liters with deionized water and steam sterilized. *E. coli* (obtained from the Wadley Research Institute, Dallas, Tex. and identified as their HAP strain) was grown aerobically for 12–18 hours at 37° C. in the above nutrient medium.

The *E. coli* cells were harvested by centrifugation at 5° C. and resuspended in 0.02 M potassium phosphate buffer, pH 8. The buffer solution was also maintained at 5° C., which temperature was maintained throughout the steps hereafter described. A sufficient quantity of the potassium phosphate buffer was used to produce a solution containing between 8 and 10% (dry-weight) cell suspension. The cell suspension was ruptured by sonication. To the ruptured cell suspension was added slowly, with stirring 0.50 volume absolute ethanol and the resultant mixture was stirred for 30 minutes and allowed to stand for an additional hour.

A precipitate of cell walls and other undesirable components, which formed after addition of the ethanol, was removed by centrifugation. To the supernatant was added 0.75 volume (of original) absolute ethanol as before and the resultant precipitate of L-Asparaginase and other proteins collected by centrifugation and suspended in 0.15 volume (of original) 0.01 M potassium phosphate buffer, pH 8.5. The non-soluble constituents were removed by centrifugation and a supernatant fraction which contained about 30 g. protein and 600,000 I.U. L-Asparaginase was passed through a 9 cm. x 120 cm. diethylaminoethyl cellulose column (DEAE-cellulose, Whatman Micro-granular DE–52) which had been equilibrated with 0.01 M potassium phosphate buffer at pH 8.5. After adsorption of the enzyme solution a linear gradient elution was effected by adding 5 liters of 0.5 M potassium phosphate buffer, pH 8.5 to a mixing chamber containing five liters of 0.03 M potassium phosphate buffer at pH 8.5. The effluent flow rate from the DEAE-cellulose column was between 300 and 400 ml./hr. Aliquots of effluent fractions were assayed for Asparaginase activity and protein content. The fractions with high specific activity were pooled, and the pH of the enzyme pool was lowered to 5.0 by dropwise addition of glacial acetic acid and the protein was precipitated with 1.2 volume ethanol. After centrifugation, the protein residue was suspended in a minimal volume of 0.05 M sodium acetate buffer, pH 5.0. The non-soluble constituents were removed by centrifugation and 100 ml. of the supernatant, which contained about 1.5 g. of protein and 140,000 I.U. L-Asparaginase was applied to a 4 cm. x 70 cm. carboxymethyl Sephadex column (CM Sephadex C–50, Pharmacia Fine Chemicals, Inc., Piscataway, N.J.) which had been equilibrated with 0.05 M sodium acetate buffer at pH 5.0. After adsorption of the enzyme solution, a linear gradient elution was effected by adding 800 ml. of a solution which was 0.5 M NaCl and 0.05 M sodium acetate at pH 5.0 to a mixing chamber containing 800 ml. 0.05 M sodium acetate buffer at pH 5.0. The effluent flow rate from the column was between about 30 and 40 ml./hr., and 15 ml. fractions were collected. Aliquots of effluent fractions were assayed for asparaginase activity and protein content. The fractions with the highest specific activity were pooled and concentrated by adding 1.2 volume ethanol. After centrifugation, the protein residue was dissolved in a minimal volume of 0.01 M phosphate buffer, pH 8.0 containing 0.2% glucose. The non-soluble constituents were removed by centrifugation. To remove any remaining endotoxin and pyrogen, the pH of the supernatant was adjusted first to 5.0 by dropwise addition of glacial acetic acid and then to 6.8–6.9 by adding a concentrated solution of KOH. The turbid mixture was then heated for 15–20 minutes at 50° C., chilled and centrifuged. The resultant supernatant was intimately mixed with Nuchar C–190 N (The Matheson Co.) activated charcoal (1.5 grams of charcoal per 100 milliliters of supernatant), allowed to stand in the cold for 30 minutes and filtered through a sterile millipore filter. The sterile enzyme solution can then be stored frozen or freeze-dried for several months without significant loss of activity.

In the removal of any residual endotoxin and pyrogen the adjustment of the pH of the supernatant to 5.0, as mentioned above, is believed to temporarily separate the endotoxin and pyrogen molecules from the L-Asparaginase. The separated endotoxin and pyrogen molecules are then removed in substantial quantities by elevation of the pH to 6.8–6.9 and addition of the charcoal. The suspension is heated to 50° C. to assist in removing some undesirable constituents and then chilled before addition of the charcoal to prevent destruction of the L-Asparaginase by the charcoal. The suspension should not be heated to a temperature in excess of 55° C. or the L-Asparaginase may be destroyed. While the mixture is preferably centrifuged after chilling of the suspension and before addition of the charcoal, the centrifugation step may be eliminated. However, the removal of the charcoal then becomes more difficult as the filter employed to remove the charcoal becomes clogged with material, other than charcoal, which is suspended in the solution.

Table I below details the data determined by analysis of the products present during various stages of the production and purification of the L-Asparaginase during the steps described above in Example I.

fer to thereby remove the L-Asparaginase leaving a residue containing cell walls and other undesirable constituents. This residue may be removed by filtration or centrifugation.

Also, by employing an anion exchange chromatographic resin such as DEAE-cellulose at one stage of

TABLE I

| Stage of purification | Total volume (ml.) | Total protein (mg.) | Total I.U. (L-Asparaginase) | Specific activity (I.U./mg. protein) | Enrichment (fold) | Total recovery (percent) |
|---|---|---|---|---|---|---|
| Ruptured cell suspension | 40,000 | 1,500,000 | 750,000 | 0.5 | | |
| Ethanol fractionation | 6,000 | 30,000 | 600,000 | 20 | 40 | 80 |
| DEAE-cellulose chromatography and concentration | 320 | 4,800 | 450,000 | 93 | 186 | 60 |
| CM-Sephadex chromatography and concentration | 30 | 780 | 350,000 | 450 | 900 | 47 |

The use of alcohol as a precipitating agent for ruptured cell walls and other undesirable constituents of microbial organisms has also been found to be far superior to the use of other precipitating agents, such as ammonium sulfate, since solutions containing L-Asparaginase need not be dialyzed for removal of the salt greatly reducing the cost of producing L-Asparaginase. Also, higher yields of relatively purer L-Asparaginase for subsequent chromatography are realized. Ethanol is also used to advantage in later stages to effect concentration of L-Asparaginase from very dilute protein solutions, especially at low pH. Further advantages of the use of ethanol are that it can be applied over a wide range of temperatures up to 37° C., bacterial contamination is not a problem, as with salts, and a wide range of pH (4–10) can be tolerated. In addition, it has been found that the enzyme precipitates at lesser concentrations of alcohol as the pH is lowered.

While ethanol (parent absolute form or diluted with water) is a preferred water-miscible organic solvent, various other solvents, including the following may be employed singly or in combination either in absolute form or diluted with water in various proportions: methanol, propanol, isopropanol, dioxane, tetrahydrofurane, and acetone.

The water-miscible organic solvents are functional to perform the steps described above since bacterial constituents have different solubilities in water-miscible organic solvents. At low concentrations of organic solvents, less soluble constituents and cell walls of the ruptured organism will precipitate from solution. By adding further quantities of an organic solvent, a concentration is reached at which a major portion of the L-Asparaginase will be precipitated from solution. When a water-miscible organic solvent other than ethanol is employed as an agent to precipitate the cell walls and concentrate the L-Asparaginase, proportions other than those described above and(or) different environment conditions may be required. The quantity to be used can be readily determined by addition of a small quantity to the ruptured cell suspension for example, and then resuspending the precipitate for the purpose of performing an L-Asparaginase assay by routine procedure. If an unwarranted quantity of L-Asparaginase is present in the precipitate, then the quantity of solvent should be lowered. If relatively small quantities of L-Asparaginase are present in the precipitate, then the quantity of solvent can be increased to assure that all of the cell walls and other undesirable constituents less soluble than L-Asparaginase are removed from solution.

If desired, an alternative procedure can be followed wherein sufficient quantity of the organic solvent is initially added to the mixture containing a ruptured microbial organism which yields L-Asparaginase to cause the L-Asparaginase to precipitate with the cell walls and other undesirable constituents present in the mixture. The precipitated residue containing the L-Asparaginase is removed from the supernatant, and extracted with buffer to thereby remove the L-Asparaginase leaving a residue containing cell walls and other undesirable constituents. This residue may be removed by filtration or centrifugation.

purification which stage is preceded with or followed by elution of the L-Asparaginase from a column containing a cation exchange resin, cleaner separation of the L-Asparaginase is realized because the likelihood of separation of protein molecules having similar charges is increased by employing resins with different charges.

Specifically, while several proteins will be eluted in the same fraction from an anion exchange resin, for example, because they possess approximately the same negative charges, the same proteins may assume positive charge of substantially different magnitude and thus may be separated when eluted from a cation exchange resin, and vice versa. Therefore, the proteins eluted in the same fraction from the first column can be separated in a second column employing a resin of a different charge.

Typical of anion exchange resins which may be employed are DEAE-cellulose, DEAE-Sephadex, DEAE-Biogel, TEAE-cellulose (Triethylamine-cellulose) and QAE-Sephadex.

The following cation exchange resins may be employed: CM-Sephadex, SE-Sephadex, CM-cellulose, CM-Biogel, Phosphonic acid cellulose, Sulfoethyl-cellulose and Amberlite IRC–50 or IRC–50 (XE–64).

The "Sephadex" resins may be obtained from Pharmacia Fine Chemicals, Inc., the "Biogel" resins from Bio-Rad Laboratories, Richmond, Calif., and "Amberlite" resins from Rohm and Haas, Philadelphia, Pa.

It will be appreciated by those skilled in the art that the microorganisms may be ruptured by various techniques other than sonication, including the use of a hydraulic or fly press, ultrasonic waves, homogenizers, pressure release devices employing compressed gases, as well as mechanical grinders and shakers.

While rather specific terms have been used to describe various embodiments of the invention, they are not intended, nor should they be construed as a limitation on the invention as defined by the following claims.

What is claimed is:

1. A method of purifying L-Asparaginase from a mixture containing a ruptured microbial organism which yields L-Asparaginase, comprising the steps of:
   adding to the mixture containing the ruptured microbial organism a sufficient quantity of a water-miscible organic solvent to precipitate the cell walls and other undesirable constituents of the organism present in the mixture without precipitating the L-Asparaginase in the solution;
   separating the precipitated cell walls and other undesirable constituents from the mixture containing the L-Asparaginase;
   adding to the supernatant containing the L-Asparaginase a sufficient quantity of a water-miscible organic solvent to precipitate the L-Asparaginase;
   separating the precipitated L-Asparaginase from the solution;
   suspending the precipitate in a buffer solution; and chromatographically separating the L-Asparaginase from other constituents which are precipitated with the L-Asparaginase.

2. The method of claim 1, wherein the L-Asparaginase is chromatographically separated by elution from a first chromatographic column followed by elution from a second chromatographic column, one of said chromatographic columns containing an anion exchange resin and the other of said chromatographic columns containing a cation exchange resin.

3. The method of claim 2, wherein said anion exchange resin is diethylaminoethyl cellulose and said cation exchange resin is a carboxymethyl resin.

4. The method of claim 2, wherein the organic solvent is ethanol.

5. The method of claim 3, containing the additional steps of:
concentrating the L-Asparaginase contained in the solution collected during elution of the L-Asparaginase from the first chromatographic column by the addition to said solution of a sufficient quantity of water-miscible organic solvent to precipitate said L-Asparaginase; and
separating the precipitate containing the L-Asparaginase from the supernatant; and
suspending the precipitate containing the L-Asparaginase in a buffer solution for admission to said second chromatographic column.

6. The method of claim 5, wherein said water-miscible organic solvent is ethanol.

7. The method of claim 5 containing the additional steps for the removal of residual endotoxin and pyrogen of:
concentrating the L-Asparaginase eluted from the second chromatographic column by adding a sufficient amount of a water-miscible organic solvent to the solution collected from the second column containing the L-Asparaginase to precipitate the L-Asparaginase;
dissolving the precipitated Asparaginase in a buffer solution and adjusting the pH of the solution first to 5.0 and then to about 6.8–6.9 to precipitate residual impurities, if present;
heating the L-Asparaginase solution and precipitated impurities to a temperature of about 50° C. to further precipitate any residual impurities;
chilling the L-Asparaginase solution and precipitated impurities and centrifuging to remove any precipitate;
intimately mixing the Asparaginase solution with about 1.5 grams of activated charcoal per 100 milliliters of the solution; and
filtering the mixture to remove the charcoal with its adherent undesirable constituents therefrom.

8. The method of claim 7, wherein:
after chilling of the L-Asparaginase solution and before intimate mixing with the charcoal, the precipitate is removed from the L-Asparaginase solution.

9. The method of claim 7, wherein said water-miscible organic solvent is ethanol.

10. The method of claim 1, containing the additional steps for the removal of residual endotoxin and pyrogen of:
concentrating the L-Asparaginase contained in the L-Asparaginase containing solution collected during the chromatographic separation by adding a sufficient quantity of a water-miscible organic solvent to precipitate the L-Asparaginase;
separating the L-Asparaginase precipitate and supernatant;
suspending the precipitate in a buffer solution;
adjusting the pH of the buffer solution containing the L-Asparaginase first to 5.0 and then to about 6.8–6.9;
heating the mixture to a temperature of about 50° C;
chilling the L-Asparaginase containing mixture;
admixing the mixture from the preceding step with about 1.5 grams of activated charcoal per 100 milliliters of the mixture; and
filtering the mixture containing the charcoal to remove the charcoal and other undesirable constituents therefrom.

11. The method of claim 10, wherein:
after chilling of the mixture and before admixing of the mixture with charcoal, the precipitate formed in the mixture is removed.

12. In a method of purifying L-Asparaginase from a mixture containing a ruptured microbial organism which yields L-Asparaginase, the step of:
adding to the mixture containing the ruptured microbial organism a sufficient quantity of a water-miscible organic solvent to precipitate the cell walls and other undesirable constituents of the organism in the mixture without precipitating the L-Asparaginase in the solution.

13. The method of claim 12, wherein the water-miscible organic solvent is ethanol.

14. In a method of purifying L-Asparaginase from a buffer solution containing L-Asparaginase, by the removal of residual endotoxin and pyrogen, the steps of:
concentrating the L-Asparaginase contained in the L-Asparaginase containing buffer solution by adding a sufficient quantity of a water-miscible organic solvent to precipitate the L-Asparaginase;
separating the L-Asparaginase precipitate and supernatant;
suspending the precipitate in a buffer solution;
adjusting the pH of the buffer solution containing the L-Asparaginase first to 5.0 and then to about 6.8–6.9;
heating the suspension to a temperature of about 50° C.;
chilling the L-Asparaginase containing mixture;
admixing the mixture with about 1.5 grams of activated charcoal per 100 milliliters of the mixture; and
filtering the mixture containing the charcoal to remove the charcoal and other undesirable constituents therefrom.

15. The method of claim 14, wherein:
after chilling of the mixture and before addition of the charcoal, the precipitate formed in the mixture is removed.

16. A method of purifying L-Asparaginase from a mixture containing a ruptured microbial organism which yields L-Asparaginase, comprising the steps of:
adding to the mixture containing the ruptured microbial organism a sufficient quantity of a water-miscible organic solvent to precipitate the L-Asparaginase with the cell walls and other undesirable constituents present in the mixture;
separating the resulting precipitate from the resulting supernate;
contacting the precipitate with a buffer solution and thereby extracting L-Asparaginase;
chromatographically separating the L-Asparaginase from other constituents which were extracted in the buffer solution.

17. The method of claim 16 wherein said water-miscible organic solvent is ethanol.

References Cited

UNITED STATES PATENTS 3,440,142    4/1969    Teller _____ 195—66

OTHER REFERENCES

Broome: U.S. National Cancer Institute, December 1965, vol. 35, No. 6, pages 967–974.

Campbell et al.: Biochemistry, vol. 6, No. 3, March 1967, pages 721–730.

Nielands et al.: Outlines of Enzyme Chemistry, 2nd ed., 1958, page 48.

LIONEL M. SHAPIRO, Primary Examiner